US006892481B2

(12) United States Patent
Yamamoto et al.

(10) Patent No.: US 6,892,481 B2
(45) Date of Patent: May 17, 2005

(54) JOYSTICK DEVICE

(75) Inventors: Ryo Yamamoto, Kobe (JP); Hideyasu Muraoka, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 44 days.

(21) Appl. No.: 10/156,332

(22) Filed: May 28, 2002

(65) Prior Publication Data

US 2002/0178624 A1 Dec. 5, 2002

(30) Foreign Application Priority Data

Jun. 1, 2001 (JP) ....................................... 2001-166425

(51) Int. Cl.[7] .................................................. G05D 1/02
(52) U.S. Cl. ........................ 37/348; 324/207.2; 345/161
(58) Field of Search ................... 37/348, 466; 172/776, 172/9, 2; 324/207.2; 345/161; D14/415

(56) References Cited

U.S. PATENT DOCUMENTS

| | | | | | |
|---|---|---|---|---|---|
| 4,459,578 | A | * | 7/1984 | Sava et al. | 338/128 |
| 4,500,867 | A | * | 2/1985 | Ishitobi et al. | 338/128 |
| 5,160,918 | A | * | 11/1992 | Saposnik et al. | 345/161 |
| 5,293,900 | A | * | 3/1994 | Karbassi et al. | 137/554 |
| 5,396,266 | A | * | 3/1995 | Brimhall | 345/161 |
| 5,598,090 | A | * | 1/1997 | Baker et al. | 322/3 |
| 5,619,195 | A | * | 4/1997 | Allen et al. | 341/20 |
| D384,984 | S | | 10/1997 | Jensen | |
| 5,694,153 | A | * | 12/1997 | Aoyagi et al. | 345/161 |
| 5,790,101 | A | | 8/1998 | Schoch et al. | |
| 5,831,554 | A | * | 11/1998 | Hedayat et al. | 341/20 |
| 5,831,596 | A | * | 11/1998 | Marshall et al. | 345/161 |
| 5,841,372 | A | | 11/1998 | Matsumoto | |
| 5,850,142 | A | * | 12/1998 | Rountos et al. | 324/207.2 |
| 5,883,690 | A | * | 3/1999 | Meyers et al. | 345/161 |
| 5,969,520 | A | * | 10/1999 | Schottler | 324/207.2 |
| 6,152,239 | A | * | 11/2000 | Kelley et al. | 172/4.5 |
| 6,226,582 | B1 | * | 5/2001 | Adsett et al. | 701/50 |
| 6,354,023 | B1 | * | 3/2002 | Trahan et al. | 37/219 |
| 6,373,466 | B2 | * | 4/2002 | Salcudean et al. | 345/161 |
| 6,462,731 | B1 | * | 10/2002 | Stoffers et al. | 345/161 |
| 6,550,562 | B2 | | 4/2003 | Brandt et al. | |
| 6,580,418 | B1 | * | 6/2003 | Grome et al. | 345/161 |
| 2001/0000187 | A1 | | 4/2001 | Peckham et al. | |

FOREIGN PATENT DOCUMENTS

| | | |
|---|---|---|
| JP | 62-106514 | 5/1987 |
| JP | 06-121383 | 4/1994 |
| JP | 06-161655 | 6/1994 |
| JP | 10-161763 | 6/1998 |
| WO | PC-WO 81/02208 | 8/1981 |
| WO | PC-WO 91/06903 | 5/1991 |

OTHER PUBLICATIONS

European Search Report for European Application No. EP 02 25 3712 completed Sep. 16, 2002.

* cited by examiner

*Primary Examiner*—Victor Batson
(74) *Attorney, Agent, or Firm*—Marshall, Gerstein & Borun LLP

(57) ABSTRACT

A joystick device is provided including a larger number of proportional control actuators than the prior art thereby enjoying higher operability. Joystick device includes an operation lever having a grip portion provided on a surface thereof with a slide switch substantially T-shaped in section. The slide switch has a web portion connected to an upper surface of a shaft rotatably supported at a lower portion of the operation panel. A magnet is embedded in a lower surface of the shaft. When the operator slides the slide switch, the web portion of the slide switch pivots about the shaft, while the shaft rotates to displace the magnet in accordance with pivotal movement of the web portion. A magnetic sensor detects a variation in magnetic field intensity in accordance with displacement of the magnet, whereby a voltage proportional to the amount of movement of the slide switch is outputted.

17 Claims, 7 Drawing Sheets

JOYSTICK DEVICE

CROSS REFERENCE TO RELATED APPLICATIONS

This application is based on and claims priority to Japanese Patent Application No. 2001-166425, filed on Jun. 1, 2001, the entire disclosure of which is herein incorporated by references for all purposes.

BACKGROUND OF THE INVENTION

The "Field of the Invention" and "Description of the Prior Art" sections have been combined under a single section.

The present invention relates to a joystick device for use as an operation device in operating construction equipment such as a hydraulic excavator or a crane.

Heretofore, joystick devices have been widely used to control various actuators (including a hydraulic cylinder, a motor and the like) included in construction equipment such as a hydraulic excavator or a crane.

FIG. 8 is a side elevational view of such a conventional hydraulic excavator, while FIG. 9 is a side elevational view of the interior of a control cabin of the conventional hydraulic excavator. As shown in FIG. 8, the hydraulic excavator includes a bucket 102, an arm 103, a boom 104, and like parts. The operator of the hydraulic excavator vertically or laterally tilts a operate lever 202 of a joystick device 201 disposed at a suitable position in the control cabin to control the operations of actuators. Thus, it is possible to control operations of the excavator including, for example, excavation/dumping with the bucket 102, raising/lowering of the arm 103 and boom 104, and turning to the right or left of the main body of the excavator.

The joystick device 201 has a grip portion provided with at least one operation button 203 on a surface thereof. The operator is capable of turning ON/OFF a switch incorporated in the joystick device 201 by depressing the operation button 203. By so doing, it is possible to control operations of the excavator including expansion/contraction of a hydraulic cylinder, forward and backward revolution of a motor, or like operations. The hydraulic cylinder and the motor function as an actuator for attachments (including a crusher and a grapple for example) of the bucket 102.

Usually, two such operation buttons 203 are provided as one set and each of the buttons 203 correspond to one such switch as described above. The switch corresponding to each operation button 203 is turned ON/OFF alternately to achieve switching between expansion and contraction of the hydraulic cylinder or between forward revolution and backward revolution of the motor.

Such a conventional joystick device 201 has a function of outputting a hydraulic or electric signal proportional to the amount of operation of the operation lever 202 when the operation lever 202 is tilted. Thus, the joystick device 201 is imparted with such high operability as to control expansion/contraction of the hydraulic cylinder, revolution of the motor or like operations at a speed proportional to the angle of tilt of the operation lever 202. As a result, the joystick 201 is capable of easily performing fine controls in positioning of the bucket 102 for example.

On the other hand, the aforementioned attachments are controlled based on ON/OFF switching through depressing of the corresponding operation buttons 203 and, hence, expansion/contraction of the hydraulic cylinder or the revolution of the motor can be controlled not at a variable speed but at a constant speed. The hydraulic cylinder and the motor function as the actuator of such an attachment. For this reason, the joystick device 201 has a difficulty in fine controls of the attachments such as positioning.

Further, in some cases the disposition of the two operation buttons 203 of the conventional joystick device 201 does not correspond to the direction in which the corresponding attachment is to be displaced, thus resulting in poor operability. Specifically, if an attachment adapted to rotate laterally is controlled with two operation buttons 203 that are vertically arranged in a row for example, the disposition (vertical direction) of the two operation buttons 203 does not correspond to the direction (lateral direction) in which the attachment is to be displaced, which raises a problem that the operator, particularly one who is unfamiliar with the operation of such a joystick, must pay attention to the difference in direction every time the attachment is to be operated, or like problems.

The present invention has been made in view of the foregoing circumstances. It is, therefore, an object of the present invention to provide a joystick device imparted with improved operability as compared with the prior art by virtue of the provision of operation means enabling proportional control at the tip of an operation lever or the provision of operation means of which the disposition is changeable in accordance with the direction in which a subject for operation is to be displaced.

BRIEF SUMMARY OF THE INVENTION

With a view to solving the foregoing problems, a joystick device according to a first aspect of the present invention comprises an operation lever capable of being pivotally supported at a base end thereof, first operation means located at a tip portion of the operation lever and supported so as to be movable in a predetermined direction, and voltage outputting means for outputting a voltage proportional to the amount of movement of the first operation means.

With the joystick device according to the first aspect of the present invention, it is possible to output a voltage proportional to the amount of movement of the first operation means caused by manipulation of the first operation means. Accordingly, manipulation of the first operation means enables proportional control of an actuator included in construction equipment for example or like control. Thus, the joystick device is capable of performing proportional control of an actuator of an attachment added to a bucket included in a hydraulic excavator for example or like control and hence enjoys improved operability as compared with the prior art.

In the joystick device according to the first aspect of the present invention, it is possible that the voltage outputting means includes a magnet that is displaceable in accordance with movement of the first operation means, and a sensor for detecting a magnetic field intensity varying in accordance with displacement of the magnet, and is constructed to output a voltage proportional to a variation in magnetic field intensity detected by the sensor. Use of such a generally available magnetic sensor allows the voltage outputting means to output a voltage proportional to the amount of movement of the first operation means. In this case it is possible to employ a magnetoresistive device or a Hall device for example as the magnetic sensor.

The joystick device according to the first aspect of the present invention may further comprise a rotating shaft connected to the first operation means and rotatably supported by the operation lever, wherein the magnet is mounted on the rotating shaft so as to be displaceable with rotation of the rotating shaft in accordance with movement of the first operation means. Mounting of the magnet on the rotating shaft makes it possible to render the joystick device compact.

The joystick device according to the first aspect of the present invention may further comprise biasing means for returning the first operation means to a home position. This feature is capable of returning the first operation means to the home position easily when the first operation means is at a position moved from the home position through manipulation of the first operation means by the operator. Thus, the joystick device is imparted with further improved operability.

Also, the joystick device according to the first aspect of the present invention may further comprise a built-in amplifier for amplifying the voltage outputted by the voltage outputting means. The provision of such a built-in amplifier makes it possible to amplify the output of the voltage outputting means to a practically usable level even if the output is very low.

Still also, the joystick device according to the first aspect of the present invention may further comprise a built-in regulator for regulating the voltage outputted by the voltage outputting means. Even if there is a deviation between the neutral position of the first operation means and the neutral position of the outputted voltage, the provision of such a built-in regulator makes it possible to regulate the voltage so as to cancel such a deviation.

A joystick device according to a second aspect of the present invention comprises an operation lever capable of being pivotally supported at a base end thereof, first operation means located at a tip portion of the operation lever and supported so as to be movable in a predetermined direction, and an operation panel removably mounted on the operation lever so as to position between the first operation means and the operation lever, the operation panel being rotatable together with the first operation means and fixable.

According to the second aspect of the present invention, the first operation means rotates as the operation panel is rotated and, hence, the movable direction of the first operation means can be changed. Thus, it is possible to adjust the movable direction of the first operation means in accordance with the direction in which a subject for operation is to be displaced. Specifically, when, for example, the revolution of a motor serving as an actuator for laterally rotating the subject is to be controlled, the first operation means is made laterally movable. On the other hand, when the expansion/contraction of a hydraulic cylinder serving as an actuator for vertically moving the subject is to be controlled, the first operation means is made vertically movable.

Likewise, rotating the operation panel allows the position of the first operation means to be changed. Thus, it is also possible to adjust the disposition of the first operation means in accordance with the direction in which the subject is to be displaced. Specifically, when the revolution of the motor serving as the actuator for laterally rotating the subject is to be controlled by alternately depressing two such first operation means for example, adjustment is made to laterally arrange the two first operation means in a row. On the other hand, when the expansion/contraction of a hydraulic cylinder serving as an actuator for vertically moving the subject is to be controlled, adjustment is made to vertically arrange the two first operation means in a row.

By thus making the movable direction or the disposition of the first operation means correspond to the direction in which the subject is to be displaced, easy operation based on operator's intuition becomes possible. As a result, the joystick device can enjoy considerably improved operability.

The joystick device according to the second aspect of the present invention may have a feature that the operation lever comprises a hollow body defining an opening portion shaped to allow the operation panel to be fitted therein, wherein the operation panel is fixed when fitted in the opening portion. This feature allows the operation panel to be fixed reliably.

In the joystick device having such a feature, an arrangement is possible such that the operation lever has a fitting portion formed with recessed or projecting portions, while the operation panel has a fitting portion formed with projecting or recessed portions each of which is engageable with any one of the recessed or projecting portions of the operation lever, wherein when a combination of the recessed portions and the projecting portions in engagement is changed to another combination, the operation panel is rotated through a predetermined angle and fixed. This arrangement is capable of adjusting the movable direction or the disposition of the first operation means.

The joystick device according to the second aspect of the present invention may further comprise second operation means expandably and retractably supported on the operation lever, and a switch which is secured to the second operation means and is capable of being actuated for ON/OFF operations in response to expansion/retraction of the second operation means, the switch having an actuating portion positioned on an axis of rotation of the operation panel. In this arrangement, the position of the actuating portion of the switch is unchangeable even if the operation panel is rotated. Thus, even if the operation panel is rotated to change the movable direction of the first operation means or for a like purpose, there is no need to take measures, such as changing the position of the second operation means used to turn the switch ON/OFF, to meet such a condition.

Also, the joystick device according to the second aspect of the present invention may further comprise voltage outputting means for outputting a voltage proportional to the amount of movement of the first operation means. This arrangement makes it possible to output a voltage proportional to the amount of movement of the first operation means.

The above and further objects and features of the invention will more fully be apparent from the following detailed description with accompanying drawings.

Other features and advantages are inherent in the communication stations and systems claimed and disclosed or will become apparent to those skilled in the art from the following detailed description in conjunction with accompanying drawings.

Figure 8:
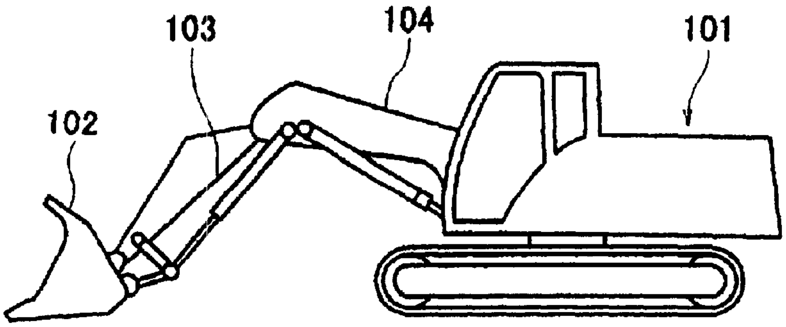
FIG.8 PRIOR ART
Figure 9:
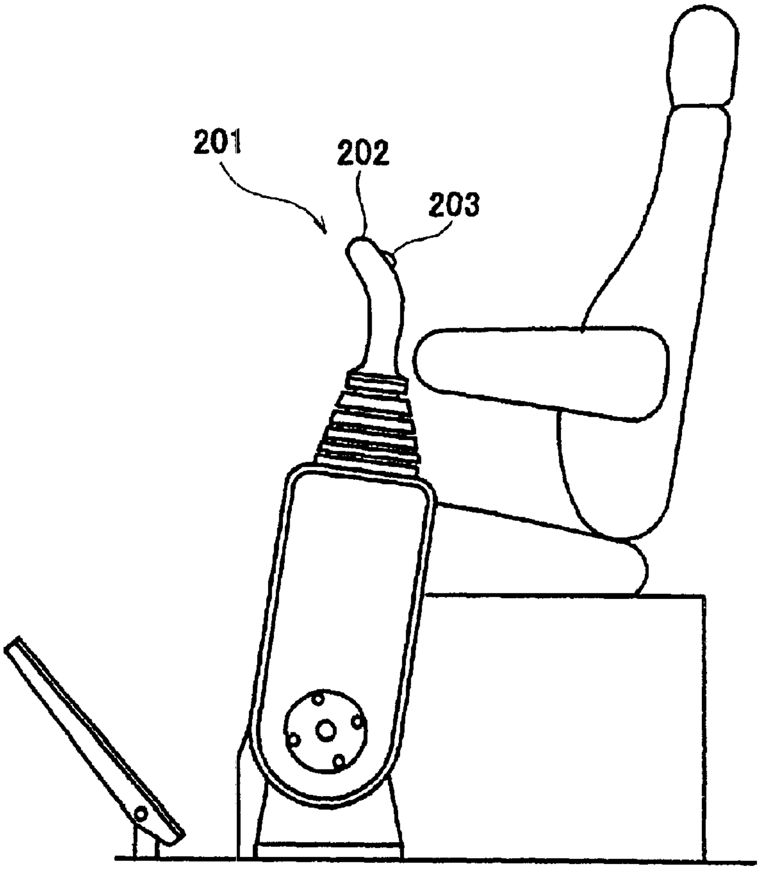
FIG.9 PRIOR ART

3 for illustrating a feature that an operation panel included in the joystick device can be rotated and fitted;

FIG. 8 is a side elevational view showing a conventional hydraulic excavator; and FIG. 9 is a side elevational view showing the interior of a control cabin of the conventional hydraulic excavator.

DETAILED DESCRIPTION OF THE PREFERRED EMBODIMENTS

The present invention will now be described in detail by way of its embodiments with reference to the accompanying drawings.

A joystick device according to the present invention is used as an operation device of construction equipment such as a hydraulic excavator or a crane. The joystick device is located within the control cabin of such construction equipment so as to face the operator as seated on the operation seat. The joystick device according to the present invention may be used as an operation device of a game-dedicated computer for example as well as of construction equipment.

Figure 1:
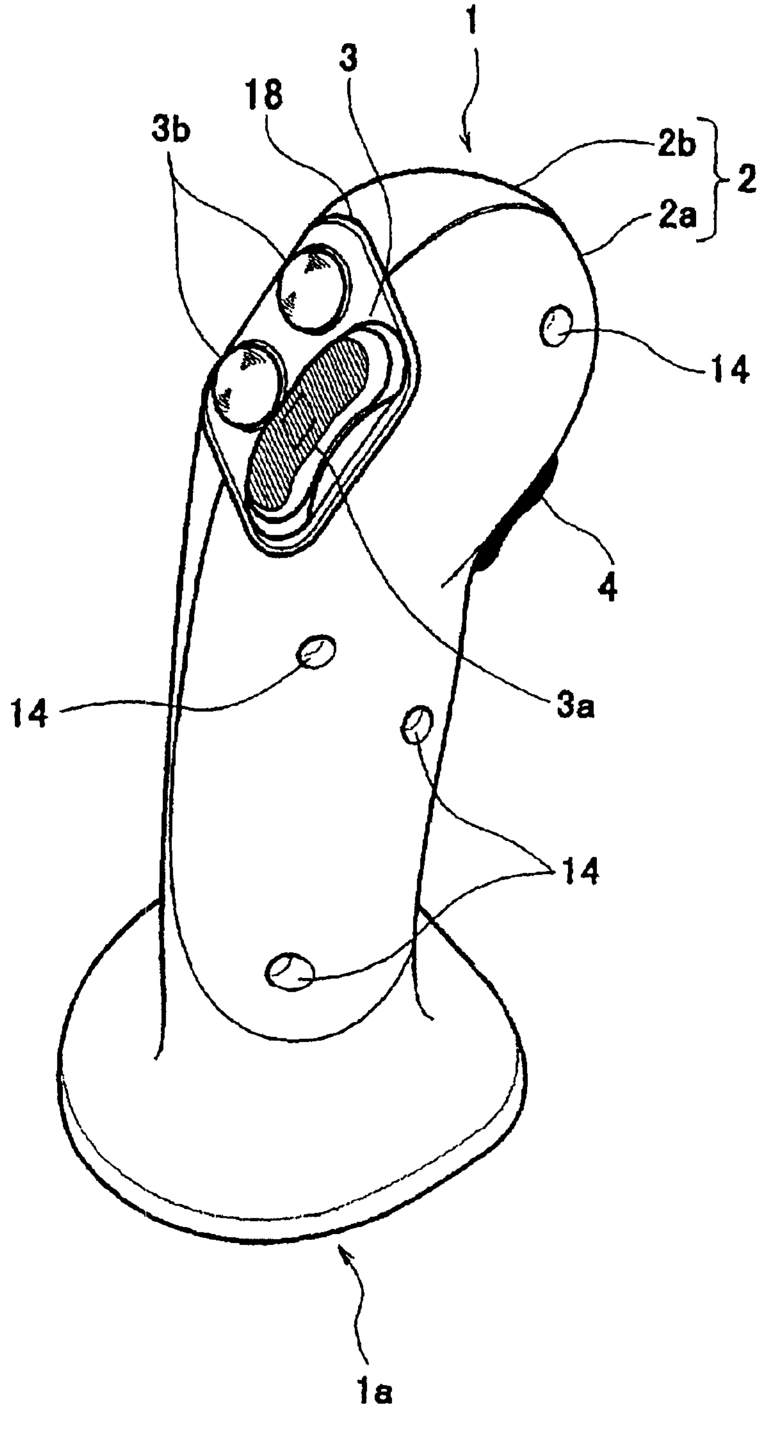
FIG. 1 is a perspective view showing the construction of a joystick device embodying the present invention.
Figure 2:
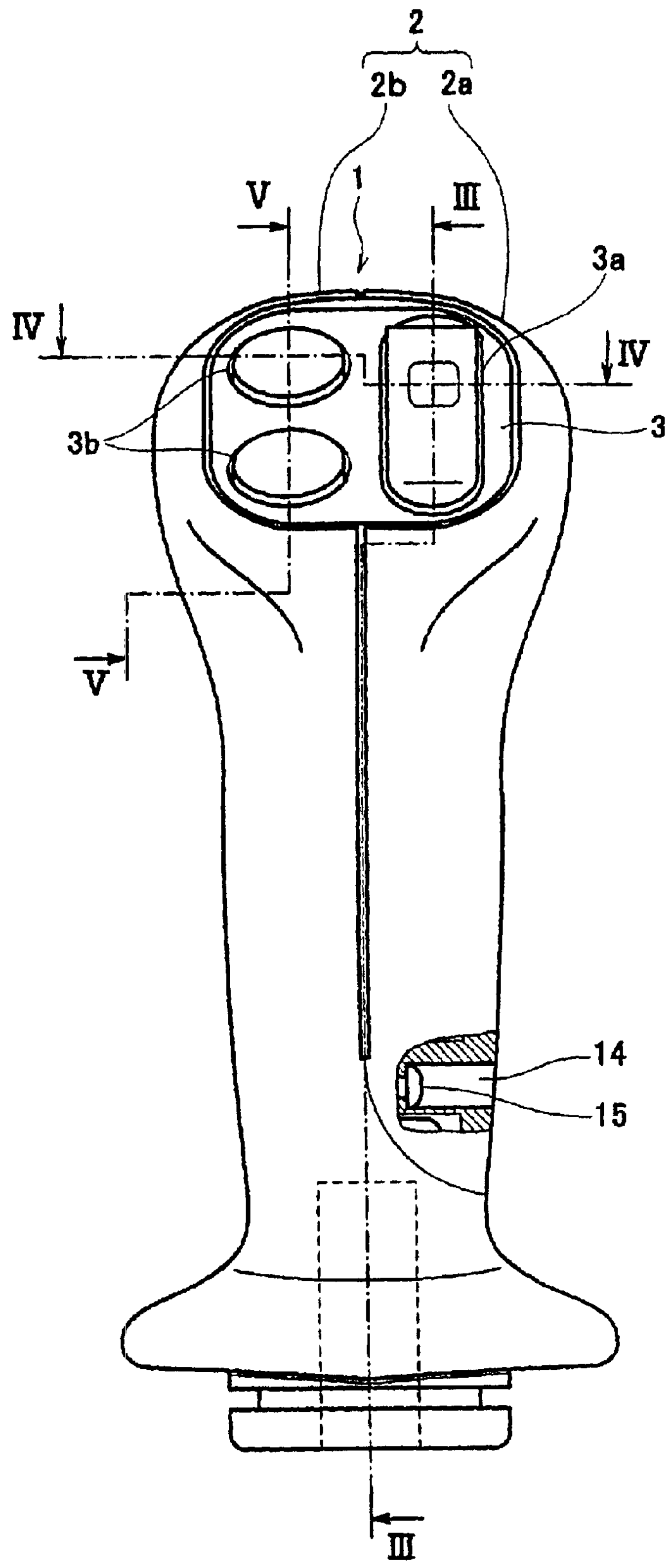
FIG. 2 is a front elevational view showing the construction of the joystick device.

FIG. 1 is a perspective view showing the construction of a joystick device embodying the present invention, while FIG. 2 is a partially cutaway front elevational view of the casing of the joystick device. As shown in FIGS. 1 and 2, the joystick device 1 includes an operation lever 2 having a base end la pivotally supported on a base (not shown). The operation lever 2 is a hollow body comprising casings 2*a* and 2*b* as vertically separable mating halves. The casing 2*a* defines screw-receiving holes 14 each extending thicknesswise therethrough at appropriate portions. The casing 2*b* is formed with female screws at locations corresponding to the screw-receiving holes 14. As illustrated by the cutaway portion in FIG. 2, male screws 15 are threadingly engaged with the corresponding female screws formed at the casing 2*b* through the corresponding screw-receiving holes 14 defined at the casing 2*a* to fasten the casings 2*a* and 2*b* to each other.

The operator grasps the operation lever 2 so that the thumb of the operator's right or left hand is placed on the front side of a tip portion of the operation lever 2 while other fingers of the same hand placed on the rear side of a central portion of the operation lever 2. The front side of the tip portion, on which the thumb of the operator is placed, defines a square opening portion 18 in which an operation panel 3 is fitted. A substantially rectangular slide switch 3*a* is supported on the operation panel 3 so as to be slidable on the operation panel 3 in one direction. The operator slides the slide switch 3*a* longitudinally thereof with the thumb of the hand grasping the operation lever 2 to manipulate the slide switch 3*a*. Though the slide switch 3*a* shown in FIGS. 1 and 2 is vertically slidable, it may be made slidable in any other direction than the vertical direction. The operation panel 3 also supports two circular operation buttons 3*a* and 3*b* so that they are expandable and retractable relative to the operation panel 3. The operator manipulates these buttons 3*a* and 3*b* by depressing them with the thumb or other finger of the same hand.

On the other hand, an operation button 4 is supported on the rear side of the central portion of the operation lever 2, that is, on the side opposite from the side where the operation panel 3 is fitted, so as to be expandable and retractable relative to the operation lever 2. The operator manipulates the operation button 4 by depressing it with the forefinger or other finger of the hand grasping the operation lever 2.

Figure 3:
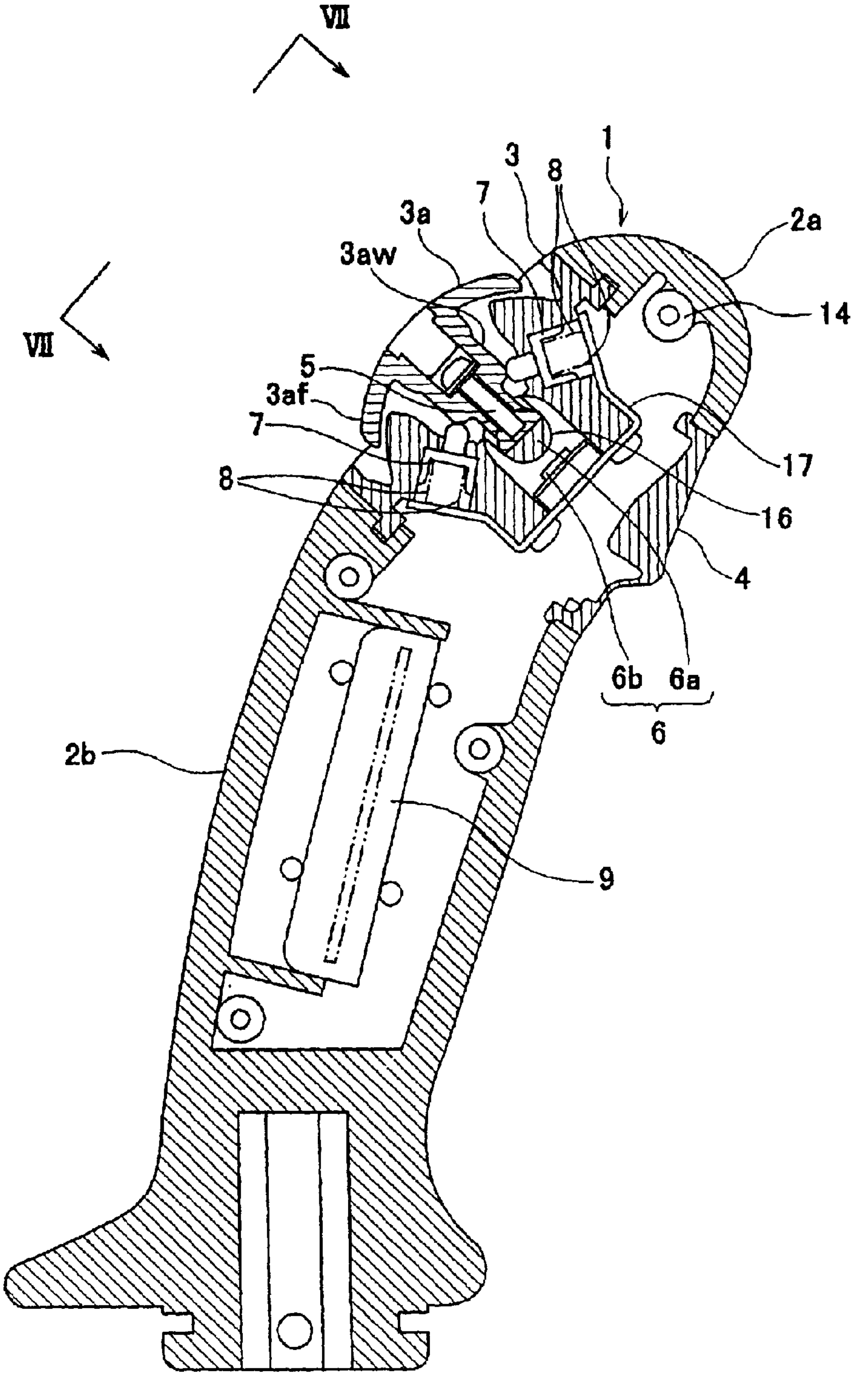
FIG. 3 is a sectional view taken on line III—III in FIG. 2.

FIG. 3 is a sectional view taken on line III—III in FIG. 2. As shown in FIG. 3, the slide switch 3*a* is substantially T-shaped in section taken on line III—III and has a flange part 3*af* which slides longitudinally of the slide switch 3*a* on the surface of the operation panel 3 when the operator slides the slide switch 3*a*. The flange part 3*af* has opposite portions extending from a central portion to opposite edges thereof with downward inclination at a predetermined angle, while the operation panel 3 has surfaces inwardly dented along these inclined portions.

A machine screw 5 is inserted into a hole extending through a web portion 3*aw* of the slide switch 3*a*. The machine screw 5 has an upper portion fixed in the web portion 3*aw* and a lower end connected to an upper surface of a shaft 16 rotatably supported at a lower portion of the operation panel 3 (see FIG. 4). Thus, when the operator slides the slide switch 3*a* longitudinally thereof, the web portion 3*aw* of the slide switch 3*a* pivots about the shaft 16 in the same direction as the longitudinal direction of the slide switch 3*a*.

Piston members 7,7 abut the web portion 3*aw* of the slide switch 3*a* from above and from below. These piston members 7,7 are biased toward the web portion 3*aw* by springs 8,8 mounted on a frame 17 covering the operation panel 3 from below. Thus, under the condition that the slide switch 3*a* is at a position moved from a neutral position, i.e. its home position, by the operator sliding the slide switch 3*a*, releasing the slide switch 3*a* from this condition causes the piston members 7,7 to press the slide switch 3*a* from above and from below thereby to return it to the neutral position.

The operation panel 3 is provided with a non-contact type potentiometer 6 therein. The potentiometer 6 includes a magnet 6*a* embedded in a lower surface of the shaft 16, and a magnetic sensor 6*b* comprising a pair of serially connected magnetoresistive devices. The magnetic sensor 6*b* is mounted on the frame 17 at an appropriate location spaced apart a predetermined distance from the shaft 16. When the operator slides the slide switch 3*a*, the web portion 3*aw* of the slide switch 3*a* pivots, while the shaft 16 rotates with this pivotal movement to cause the magnet 6*a* to be displaced. The magnetic field intensity varies in accordance with displacement of the magnet 6*a*, with the result that the resistance of the magnetoresistive devices forming the magnetic sensor 6*b* varies. When the magnetic sensor 6*b* is applied with a voltage at its one terminal with the other terminal grounded, a voltage proportional to displacement of the magnet 6*a* is outputted from the connecting point between the pair of magnetoresistive devices. In this way, it is possible to output a voltage proportional to the amount of movement of the slide switch 3*a*.

By thus fitting the magnet 6*a* to the shaft 16, the potentiometer 6 can be made compact. For this reason, the size of the joystick device 1 does not become significantly larger than that of the conventional joystick device even if the potentiometer 6 is located within the operation lever 2.

Since such a potentiometer 6 is of the non-contact type, the potentiometer 6 is advantageous over a contact-type one in that it has superior durability and is less susceptible to noise.

Though the magnetic sensor 6*b* in this embodiment consists of the pair of magnetoresistive devices, it is possible to use a Hall device or the like instead of such a magnetoresistive device. An alternative arrangement employing a position sensitive light detector (PSD) is possible as a substitute for the arrangement employing the magnetic sensor. Such an arrangement employing a PSD is also capable of detecting the angle of rotation of the shaft 16 in a non-contact fashion and outputting a voltage proportional to the angle of rotation thus detected.

A controller 9 is mounted at a central portion within the operation lever 2. As will be described later, the controller 9 has functions including amplification and regulation of the voltage outputted from the potentiometer 6.

Figure 4:
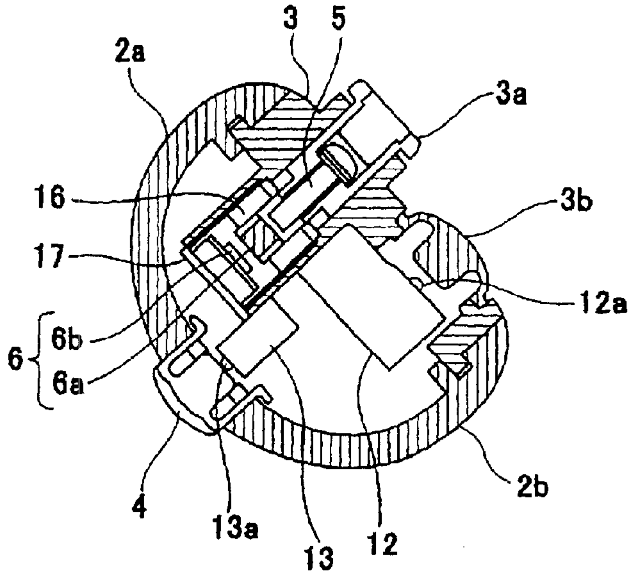
FIG. 4 is a sectional view taken on line VI—VI in FIG. 2.
Figure 5:
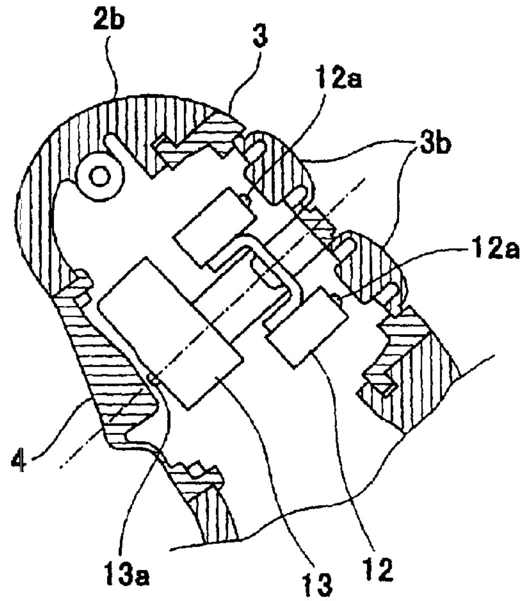
FIG. 5 is a sectional view taken on line V—V in FIG. 2.

FIG. 4 is a sectional view taken on line IV—IV in FIG. 2, and FIG. 5 is also a sectional view taken on line V—V in FIG. 2. As shown in FIGS. 4 and 5, switches 12,12 and switch 13 are secured to the operation panel 3. The switches 12,12 are disposed so as to be capable of ON/OFF operation when actuated through their respective actuating portions 12*a*,12*a* in response to depressing of the corresponding operation buttons 3*b*,3*b* described above. The switch 13, on the other hand, is disposed so as to be capable of ON/OFF operation when actuated through its actuating portion 13*a* in response to depressing of the operation button 4. The actuating portion 13*a* is positioned on the axis of rotation (depicted by the dashed dotted line in FIG. 5) of the operation panel 3. Accordingly, the position of the actuating portion 13*a* is unchangeable even when the operation panel 3 is rotated.

Figure 6:
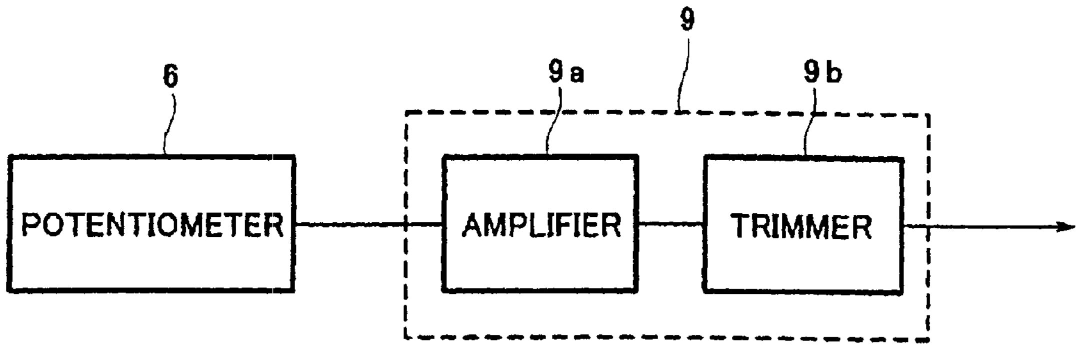
FIG. 6 is a block diagram showing the configuration of a controller included in the joystick device.

FIG. 6 is a block diagram showing the configuration of the foregoing controller 9. As shown in FIG. 6, the controller 9 comprises an amplifier 9*a* and a trimmer 9*b*. The amplifier 9*a* functions to amplify the voltage outputted from the potentiometer 6, while the trimmer 9*b* performs bias adjustment and gain adjustment of the voltage amplified by the amplifier 9*a*. The provision of the amplifier 9*a* makes it possible to amplify the voltage outputted from the magnetic sensor 6*b* to a practically usable level even if the outputted voltage is very low. The provision of the trimmer 9*b* allows easy adjustments such as to cause a half of the voltage supplied from the power source to be outputted when the slide switch 3*a* is at the neutral position for example.

The controller 9 comprising the amplifier 9*a* and the trimmer 9*b* is located within the operation lever 2 as described above. Thus, the handling of the operation lever 2 is easier than in the case where such amplifier and trimmer are located outside the operation lever.

FIGS. 7A–7D are explanatory views as viewed in terms of line VII—VII in the direction indicated by arrow in FIG. 3 for illustrating a feature that the movable direction of the slide switch 3*a* and the disposition of the operation buttons 3*b*,3*b* are changeable. As shown in FIGS. 7A–7D, each side of the substantially square operation panel 3 is formed with a projecting portion 10 protruding outwardly. The casings 2*a* and 2*b* are formed with recessed portions 11 each shaped so as to be engageable with any one of the projecting portions 10. The operation panel 3 is mounted on the operation lever 2 by fastening the casings 2*a* and 2*b* to each other in such a manner that each of the recessed portions 11 engages each of the projecting portions 10.

The movable direction of the slide switch 3*a* and the disposition of the operation buttons 3*b*, 3*b* can be changed as follows. First, the casings 2*a* and 2*b* are separated from each other to release the engagement between the projecting portions 10 and the recessed portions 11. Subsequently, the operation panel 3 is rotated 90° or 180°, then the projecting portions 10 and the recessed portions 11 are engaged with each other again, and the casings 2*a* and 2*b* are fastened to each other to fix the operation panel 3. Since the slide switch 3*a* also rotates together with the operation panel 3, the movable direction of the slide switch 3*a* and the disposition of the operation buttons 3*b*,3*b* are changed.

Figure 7A:
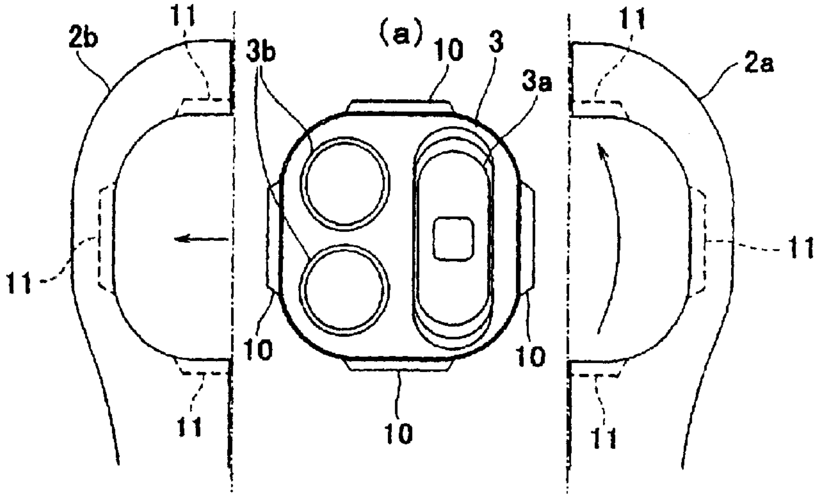
FIGS. 7A–7D are explanatory views as viewed in terms of line VII—VII in the direction indicated by arrow in FIG.

In the case shown in FIG. 7A, the slide switch 3*a* in a vertically slidable state is located on the right-hand side of the joystick device 1 in front view, while the operation buttons 3*b*,3*b* in a state vertically arranged in a row are located on the left-hand side of the joystick device 1 in front view. When the operation panel 3 is rotated 90° in the direction indicated by arrow from the state shown in FIG. 7A and fixed, the slide switch 3*a* becomes laterally slidable, while the operation buttons 3*b*,3*b* assume a state laterally arranged in a row, as shown in FIG. 7B.

Figure 7B:
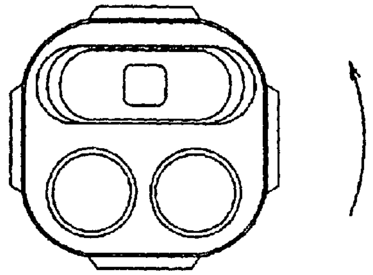
Figure 7C:
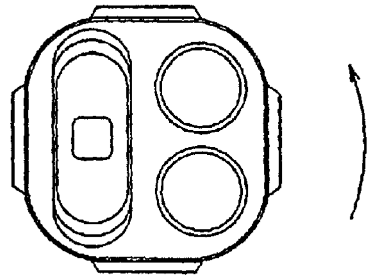
Figure 7D:
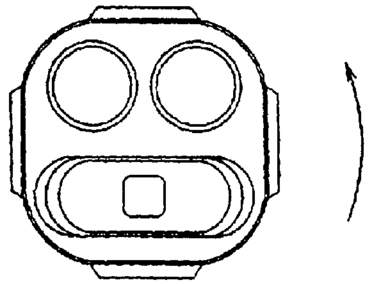

The operation panel 3 can be mounted to assume a state shown in FIG. 7C or FIG. 7D when the operation panel 3 is further rotated 90° or 180° in the direction indicated by arrow and fixed in the same manner as described above. Thus, the operation panel 3 is mounted on the operation lever 2 to assume any one of the four different states according to the preference of the operator.

When the revolution of a motor serving as an actuator for laterally rotating a grapple for example is to be controlled using the slide switch 3*a* (or the operation buttons 3*b*,3*b*), the operation panel 3 is rotated and fixed to assume a state shown in FIG. 7B or 7D where the slide switch 3*a* is laterally slidable (or the operation buttons 3*b*,3*b* are laterally arranged in a row). On the other hand, when expansion/contraction of a hydraulic cylinder serving as an actuator for vertically moving a crusher for example is to be controlled using the slide switch 3*a* (or the operation buttons 3*b*,3*b*), the operation panel 3 is rotated and fixed to assume a state shown in FIG. 7A or 7C where the slide switch 3*a* is vertically slidable (or the operation buttons 3*b*,3*b* are vertically arranged in a row). As a result, the movable direction of the slide switch 3*a* (or the disposition of operation buttons 3*b*,3*b*) is made corresponding to the direction in which the subject for operation such as the grapple or the crusher is to be displaced. Thus, easy operation based on operator's intuition becomes possible and, hence, the joystick device enjoys considerably improved operability.

While the operation panel 3 in this embodiment can be fixed after each 90° rotation, it is needless to say that the operation panel 3 can be fixed after each rotation through a different angle than 90° if the shape of the operation panel 3 and the numbers of projecting portions 10 and recessed portions 11 are varied. For example, an arrangement is possible such that the operation panel can be fixed after each rotation through any desired angle if the operation panel 3 is shaped circular and the numbers of projecting portions 10 and recessed portions 11 are increased as large as possible.

As described above, the actuating portion 13*a* of the switch 13 is positioned on the axis of rotation of the operation panel 3. Accordingly, the position of the actuating portion 13*a* is unchangeable irrespective of the operation panel 3 rotating to assume any one of the states shown in FIGS. 7A to 7D. Thus, the operation button 4 can be used without the necessity of changing the position of the operation button 4 even when the operation panel 3 is rotated.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A joystick device comprising:

an operation lever capable of being pivotally supported at a base end thereof;

first operation means located at a tip portion of the operation lever and including a web part and a flange part, the web part being supported to be pivotable in a predetermined direction, and the flange part being slidable on the operation lever according to a pivot operation of the web part; and voltage outputting means for outputting a voltage proportional to the amount of movement of the first operation means, wherein the voltage outputting means includes a magnet that is displaceable in accordance with movement of the first operation means, and a sensor for detecting a magnetic field intensity varying in accordance with displacement of the magnet, and is constructed to output a voltage proportional to a variation in magnetic field intensity detected by the sensor.

2. The joystick device according to claim 1, further comprising a rotating shaft connected to the first operation means and rotatably supported by the operation lever, wherein the magnet is mounted on the rotating shaft so as to be displaceable with rotation of the rotating shaft in accordance with movement of the first operation means.

3. The joystick device according to the claim 2, wherein the magnet and the sensor are arranged in a direction from the first operation means toward the rotating shaft.

4. The joystick device according to claim 1, further comprising biasing means for returning the first operation means to a home position.

5. The joystick device according to claim 1, further comprising a built-in amplifier for amplifying the voltage outputted by the voltage outputting means.

6. The joystick device according to claim 1, further comprising a built-in regulator for regulating the voltage outputted by the voltage outputting means.

7. The joystick device according to claim 1, wherein the first operation means is capable of being operated by a finger of an operator.

8. A joystick device comprising an operation lever capable of being pivotally supported at a base end thereof, first operation means located at a tip portion of the operation lever and supported so as to be movable in a predetermined direction, and an operation panel positioned between the first operation means and the operation lever and removably mounted on the operation lever, the operation panel being rotatable together with the first operation means and fixable.

9. The joystick device according to claim 8, wherein: the operation lever comprises a hollow body defining an opening portion shaped to allow the operation panel to be fitted therein; and the operation panel is fixed when fitted in the opening portion.

10. The joystick device according to claim 9, wherein the operation lever has a fitting portion formed with recessed or projecting portions, while the operation panel has a fitting portion formed with projecting or recessed portions each of which is engageable with any one of the recessed or projecting portions of the operation lever, wherein when a combination of the recessed portions and the projecting portions in engagement is changed to another combination, the operation panel is rotated through a predetermined angle and fixed.

11. The joystick device according to claim 8, further comprising second operation means expandably and retractably supported on the operation lever, and a switch which is secured to the second operation means and is capable of being actuated for ON/OFF operations in response to expansion/retraction of the second operation means, the switch having an actuating portion positioned on an axis of rotation of the operation panel.

12. The joystick device according to claim 8, further comprising voltage outputting means for outputting a voltage proportional to the amount of movement of the first operation means.

13. A joystick device for use in operation of construction equipment, comprising:

an operation lever capable of being pivotally supported at a base end thereof and adapted to be operatively connected to construction equipment;

first operation means located at a tip portion of the operation lever and including a web part and a flange part, the web part being supported to be pivotable in a predetermined direction, and the flange part being slidable on the operation lever according to a pivot operation of the web part; and voltage outputting means for outputting a voltage proportional to the amount of movement of the first operation means, wherein the voltage outputting means includes a magnet that is displaceable in accordance with movement of the first operation means, and a sensor for detecting a magnetic filed intensity varying in accordance with displacement of the magnet, and is constructed to output a voltage proportional to a variation in magnetic field intensity detected by the sensor.

14. The joystick device according to claim 13, further comprising a rotating shaft connected to the first operation means and rotatably supported by the operation lever, wherein the magnet is mounted on the rotating shaft so as to be displaceable with rotation of the rotating shaft in accordance with movement of the first operation means.

15. The joystick device according to claim 13, further comprising biasing means for returning the first operation means to a home position.

16. The joystick device according to claim 13, further comprising a built-in amplifier for amplifying the voltage outputted by the voltage outputting means.

17. The joystick device according to claim 13, further comprising a built-in regulator for regulating the voltage outputted by the voltage outputting means.

* * * * *

UNITED STATES PATENT AND TRADEMARK OFFICE

CERTIFICATE OF CORRECTION

PATENT NO. : 6,892,481 B2
APPLICATION NO. : 10/156332
DATED : May 17, 2005
INVENTOR(S) : Ryo Yamamoto et al.

It is certified that error appears in the above-identified patent and that said Letters Patent is hereby corrected as shown below:

Title page, (75) Inventors, line 1, "Kobe" should be -- Hyogo--.

Title page, (75) Inventors, line 2, "Akashi" should be -- Hyogo--.

Column 10, line 34, "filed" should be -- field--.

Signed and Sealed this

Thirteenth Day of February, 2007

JON W. DUDAS

*Director of the United States Patent and Trademark Office*